(12) United States Patent
Baldelli et al.

(10) Patent No.: US 9,667,915 B2
(45) Date of Patent: May 30, 2017

(54) METHOD AND SYSTEM FOR VIDEO CONFERENCE AND PC USER EXPERIENCE INTEGRATION

(71) Applicant: AVAYA, INC., Basking Ridge, NJ (US)

(72) Inventors: Laura Baldelli, Ancona (IT);
Alessandra Centanni, Ancona (IT);
Claudio Panini, Ancona (IT)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/093,688

(22) Filed: Dec. 2, 2013

(65) Prior Publication Data

US 2014/0160225 A1 Jun. 12, 2014

Related U.S. Application Data

(60) Provisional application No. 61/735,651, filed on Dec. 11, 2012.

(51) Int. Cl.
*H04N 7/14* (2006.01)
*H04N 7/15* (2006.01)

(52) U.S. Cl.
CPC .............. *H04N 7/15* (2013.01); *H04N 7/142* (2013.01)

(58) Field of Classification Search
CPC .......... H04N 7/15; H04N 7/141; H04N 7/142; H04N 7/14; H04N 1/00299; H04N 1/42; H04N 2007/145; H04N 7/147; H04N 7/148; H04N 1/0035; H04N 1/00411; H04N 7/155; G06F 3/01; G06F 3/14; G06F 3/1454; G06F 2203/0384; G06F 3/038; G06F 3/1423; G09G 2370/16; G09G 2340/0407; G09G 2370/04; H04M 2201/50; H04M 3/567; H04M 1/2473; H04M 2201/38; H04L 2012/2849
USPC ............................................ 348/14.08, 14.01
See application file for complete search history.

(56) References Cited

U.S. PATENT DOCUMENTS

| | | | |
|---|---|---|---|
| 8,558,862 B2* | 10/2013 | Kulkarni | H04N 7/142 348/14.01 |
| 2002/0107014 A1* | 8/2002 | Kosuri | 455/426 |
| 2004/0001481 A1* | 1/2004 | Kamenetsky et al. | 370/353 |
| 2004/0235520 A1* | 11/2004 | Cadiz et al. | 455/557 |
| 2005/0069101 A1* | 3/2005 | Bear et al. | 379/88.17 |
| 2005/0231587 A1* | 10/2005 | Root et al. | 348/14.07 |
| 2006/0002543 A1* | 1/2006 | Newland | 379/368 |
| 2007/0165106 A1* | 7/2007 | Groves et al. | 348/14.08 |
| 2008/0117282 A1* | 5/2008 | Cho | 348/14.1 |
| 2010/0231556 A1* | 9/2010 | Mines | H04N 7/15 345/178 |
| 2010/0313171 A1* | 12/2010 | Yanagi | H04N 21/4113 715/856 |
| 2012/0218438 A1* | 8/2012 | Ohba | H04N 7/14 348/222.1 |
| 2013/0047189 A1* | 2/2013 | Raveendran | H04N 21/23 725/81 |

FOREIGN PATENT DOCUMENTS

| | | |
|---|---|---|
| CN | 102598651 A | 7/2012 |
| WO | 2012106644 A1 | 8/2012 |

* cited by examiner

*Primary Examiner* — Stella Woo

(57) ABSTRACT

Disclosed is a system and method for integrating a user computer with a Codec device so that operation of input devices to a computer is transferred to a display associated with the Codec.

15 Claims, 1 Drawing Sheet

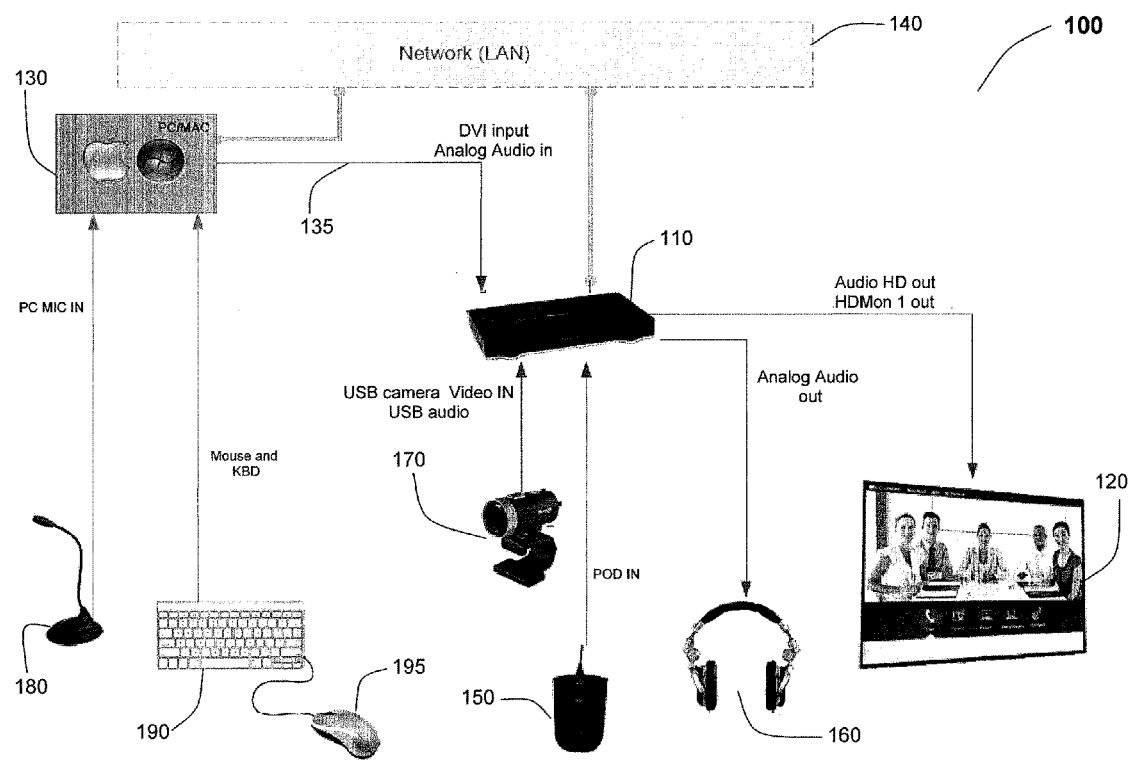

METHOD AND SYSTEM FOR VIDEO CONFERENCE AND PC USER EXPERIENCE INTEGRATION

FIELD OF THE INVENTION

The field of the invention relates generally to controlling the video conference embedded device user interface with a mouse and/or keyboard from a connected computer, while using the video conference device to show the computer's desktop or the video conference attendees.

BACKGROUND OF THE INVENTION

A personal video conferencing hardware device is generally a product or device that may be positioned on a desktop or table of a video conference participant. The personal video conferencing hardware device provides a video conferencing endpoint for that participant.

A codec is a device or computer program capable of encoding or decoding a digital data stream or signal. A codec encodes a data stream or signal for transmission, storage or encryption, or decodes it for playback or editing. Codecs are used in videoconferencing, streaming media and video editing applications. A video camera's analog-to-digital converter(ADC) converts its analog signals into digital signals, which are then passed through a video compressor for digital transmission or storage. A receiving device then runs the signal through a video decompressor. The term codec may also used as a generic name for a videoconferencing unit/device.

Videoconferencing is the conduct of a videoconference (also known as a video conference or videoteleconference) by a set of telecommunication technologies which allow two or more locations to communicate by simultaneous two-way video, audio and data transmissions. The core technology used in a videoconferencing system is digital compression of audio and video streams in real time. The hardware or software that performs compression is called a codec(coder/decoder). Other components required for a videoconferencing system may include: Video input: one or more video HD camera, or DVI input, or webcam; Video output: computer monitor, television or projector, or one or more high resolution monitor/PC displays/projectors; Audio input: microphones, CD/DVD player, cassette player, or any other source of PreAmp audio outlet, including any analog or digital or HD audio inputs; Audio output—usually loudspeakers associated with the display device or telephone, or any digital/analog/usb audio output; Audio/video/data transfer: on a digital network, LAN or Internet; and Computer—a data processing unit that ties together the other components, does the compressing and decompressing, and initiates and maintains the data linkage via the network. The video conferencing device may be a generic Software application running on a generic computer or, as in the case of the XTE, no computer at all is involved. An embedded hardware device hosts the codec functionalities, the input/output drivers and the network connectivity. It maintains the audio/video/data communication via the network with the remote peers.

SUMMARY OF THE INVENTION

An embodiment of the invention may therefore comprise a system for integrating a computer and a Codec for video conferences, the system comprising a device capable of decoding and displaying a digital data stream and a computer with one or more input devices, separate from said device, wherein both said computer and said device are connected to a network and said computer is connected to said device, and wherein said computer is enabled to control said device via said one or more input devices.

An embodiment of the invention may further comprise a method of integrating a computer and a Codec for video conferences, said method comprising connecting said computer to said Codec, connecting said computer to a network, connecting said Codec to said network, and via an application running on said computer, transferring actions of one or more input devices connected to said computer to said Codec.

BRIEF DESCRIPTION OF THE DRAWINGS

FIG. 1 shows a computer and Codec connectivity.

DETAILED DESCRIPTION OF THE EMBODIMENTS

Some embodiments may be illustrated below in conjunction with an exemplary video communication system. Although well suited for use with, e.g., a system using switch(es), server(s), and/or database(s), communications end-points, etc., the embodiments are not limited to use with any particular type of video communication system or configuration of system elements, unless otherwise noted.

A personal video conferencing hardware device is a device that is generally placed on a desktop of a videoconference participant that allows high end, hardware accelerated video conferencing endpoints. These devices may be referred to as a Desktop, Executive or All-in-One Codec.

In an embodiment of the invention, an all-in-one video conferencing codec comprises a USB video camera, microphone array and speakers integrated into a display that can be utilized as both a High Definition (HD) video conferencing display and as a primary, or additional, display for a user's computer, a PC or a Mac. FIG. 1 shows an all-in-one Codec with a Graphical User Interface (GUI—On Screen Display (OSD) menu) displayed over local video. The codec 100 comprises a display 120, a video camera 170, a microphone array 170 integrated with the camera and speaker 120 integrated into the display 120. In the all-in-one codec of FIG. 1, a user is enabled to connect an existing personal computer 130, such as a PC or a Mac, by using a DVI (Digital Visual Interface) cable. This allows the user to use the codec's monitor, connected to the PC or Mac, as their own primary monitor or as an additional monitor.

A local Graphical User Interface (GUI) of the Codec may be displayed as an On Screen Display (OSD) menu on the codec monitor. This OSD menu may be over the computer, PC or Mac, screen content displayed on the Codec monitor. The OSD menu may also be over the codec local Video. The OSD menu is controllable with a remote control unit or with a computer mouse/keyboard. The OSD menu may be hidden, so as to display only the computer content. The Codec may also combine the computer content together with additional video contents on its screen, and can show/hide the OSD GUI over the video/content composition. The XTE has a monitor. The monitor is connected to a computer via a DVI cable. The computer can have a single monitor (which may be the XTE's monitor) or more than one monitor (one of which is the XTE's monitor). The XTE monitor can display the computer's desktop content (or a portion of the desktop content, if the computer has more monitors) combined, or in the alternative with other videos (the embedded camera's content, or remote videos when in a call). Over any video (the computer content local video remote videos, or any combination thereof), the XTE can show the OSD graphical menus of the XTE. The GUI can be controlled via a remote control or (as described in this description in accordance with embodiments of the invention) the computer's mouse and/or keyboard.

Typically, while a video conference participant is utilizing their computer during a video conference, their computer content may be displayed on the Codec monitor, which is also in front of them. The display of their work content is controllable using the mouse, and/or keyboard, from their computer. The same mouse, and/or keyboard, is not useable to directly operate the GUI of the Codec when the computer output and the Codec content are visible on the same display. Essentially, the same mouse, and/or keyboard, does not control both the computer output and the Codec output. Accordingly, the Codec is managed and operated by using a separate device than the computer mouse, and/or keyboard. That separate device may be a tablet or a phone or a remote control device accompanying the Codec.

To generally operate a Codec, for instance to place a call to a remote party or to configure the codec, to share the computer content with a remote party or to change video layout or to interact in any other way with the Codec by interacting with its GUI displayed as OSD over the Codec display, it is necessary to use a separate remote device, usually a remote control. The separate remote control device may have been shipped to the user together with the Codec. A similar hardware device may also be used as noted above. In this way, the user generally experiences management of the Codec by using a separate device and that the Codec GUI may not be integrated with the computer.

In an embodiment of the invention, a the Codec GUI is shown over their desktop and perform any action on it. The option may be selected by as simple a means as clicking on an icon of the computer to select a particular mode. The actions available to a user in such a mode are the same as are available in general computer use—for example, clicking/dragging and dropping/zooming with the mouse. The keyboard may also be used for writing, for copying and pasting text, for moving with arrows over the GUI control and for taking snapshots of the video content shown on the monitor of the embedded system.

FIG. 1 shows a computer and Codec connectivity. In the system 100, a Codec 110 is connected to a Codec monitor 120. A computer 130, PC or Mac, is connected to the Codec 110. The computer 130 to Codec 110 connection 135 may be a DVI cable 135, with optional audio connection through analog/digital cable. Those skilled in the art will understand how to use different type connections to utilize embodiments of the invention. Bothe the computer 130 and the Codec 110 are connected to a network 140. The network 140 may be a LAN type network or other network. Those skilled in the art will understand how to use various networks to utilize embodiments of the invention. The Codec 110 may be connected to a POD 150, which may also be a miniPOD, an audio out device 160, such as for example a pair of headphones or speakers, and a camera 170, such as for example a USB type camera. The POD 150, or miniPOD, is an audio input device that is connected to the Codec 110. Essentially the POD 150 is a microphone but can be any device that allows audio signals to be transmitted to the Codec 110. The Codec may have an embedded camera and built-in microphone. The built in microphone (not shown) are connected to the Codec 110 if they are connected to the Codec monitor 120 as is typical. However, it is understood that a built in microphone may come in a variety of fashions. Accordingly, the POD 150 and USB camera may be optional devices depending on the Codec 110 used. The audio device 160 may also be optional depending on the Codec 110 used and whether the Codec 110 has audio capabilities.

Continuing with FIG. 1, the computer 130 is connected to an audio input device 180 and a keyboard 190 and a mouse 195. The computer audio input device 180 may be a microphone or type device which allows audio signals to be input to the computer 130. The keyboard 190 and mouse 195 allow understood manipulation of the computer 130 as is understood in the art. The computer audio input device 180 may be optional depending on the Codec 110 used as described above.

In regard to FIG. 1, it is understood that while the Codec 110 and Codec monitor 120 are shown, and described separately, they may be a combined unit where the term "Codec" is used to describe both a Codec controller 110 and the Codec monitor 120.

In operation, the computer 130 will download, or otherwise install, an application to control the Codec 110. The application is enabled to automatically connect to the Codec 110 from which it was originally acquired, in one embodiment. The application may be launched at the startup of the computer 130, or otherwise as is known in the art. A connection between the Codec 110 and the computer 130 is realized via a bidirectional socket connection, such as TCIP/IP connection, and a unidirectional connection, such as a UDP connection between the computer 130 and the Codec. Once the application is running on the computer 130, the application transfers user controls, via the keyboard 190 and mouse 195, to the Codec via the established socket connections. The application detects, automatically, if the computer 130 is utilizing he Codec monitor as a primary or additional monitor. The application converts, automatically, mouse coordinates in the computer screen resolution to Codec monitor resolution—if the resolution of the computer 130 screen is different from the resolution of the Codec monitor 120. The user is enabled to operate, with the mouse 195 and keyboard 190, directly on the Codec GUI and switch between the computer and the Codec GUI. In an embodiment of the invention, this control and switching is accomplished by utilizing an application icon on a tray bar, or on a taskbar. The application will enable control of whichever device, computer 130 or Codec 110, which the user designates. The application can also be enabled to hide the computer 130 mouse 195 cursor, such as a standard arrow or other display as is known in the art, when the mouse 195 movements are directed to the Codec 110. A different mouse cursor may be shown over the Codec GUI when is such operation in order to indicate control through the keyboard 190 or mouse 195.

Embodiments of the invention may include a variety of features. The application may indicate when connection to the Codec 110 is lost. For instance, a red cross may be used in the application icon to indicate this condition, in the traybar or taskbar. When receiving a call, the mouse 195, or keyboard 190, control is automatically transferred to the Codec system to enable ease in accepting or rejecting the call. A simple means may be used to toggle control between the computer 130 and the Codec 110. For instance, use of the CNTL key in combination with other keys may be used. A user can change video layouts and positions on the screen by dragging and dropping video contributions. A user may print the screen by utilizing a Print Screen function on the keyboard 190. The mouse 195 wheel may be used to ZOOM a PTZ (Pan, Tilt, Zoom) type camera, whether local or remote. When the mouse 195 and keyboard 190 are used to control the Codec 110, standard interaction, as understood in the art, may be available to operate on the Codec 110 GUI. These may include, for example, mouse click, double-click, right click, drag and drop, GUI navigation through arrows, GUI item selection/deletion/insertion of digits/characters/symbols/uppercase, cut/copy/paste actions and "print screen" actions. Drag and drop actions may also be available to move a Codec 110 video contribution to a different position in the Codec monitor 120. The application may automatically reconnect to the Codec 110 if the IP address changes. This automatic reconnect may be performed through service discovery, address assignment and hostname resolution services, for example. One such service, just for the purposes of explanation, can be the Bonjour implementation of zero-configuration networking from Apple. As is understood, Zero-configuration networking (zeroconf) is a methodology and a set of special technologies that automatically creates a usable computer network based on the Internet Protocol Suite (TCP/IP) when computers or network peripherals are interconnected. It does not require manual operator intervention or special configuration servers. Without zeroconf, a network administrator must set up services, such as Dynamic Host Configuration Protocol (DHCP) and Domain Name System (DNS), or configure each computer's network settings manually.

Embodiments may further include enabling the application to identify a list of Codecs available on the network 140 and to connect to any of them. The application may receive indications from a Codec about its status and change the application indication, such as the appearance of an icon on the taskbar/traybar, to notify the user about the Codec status. These status changes and indications may include whether the Codec is controlled by the computer or not, whether the Codec is sharing the computer content in a call, for example. In order to ensure security, the Codec may be enabled to identify the user trying to connect by a security mechanism, such as a user code that is visualized in the Codec GUI and must be inserted in the application GUI to assure that only the user that is physically in front of the Codec screen is able to connect to the Codec using the application.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for integrating a computer and a Codec for video conferences, said system comprising:
   a device capable of decoding and displaying a digital data stream via a Codec monitor, wherein said device comprises an endpoint to a videoconference and said digital data stream comprises video content for said videoconference; and
   a computer with one or more input devices, wherein said computer is separate from said device;
   wherein both said computer and said device are connected to a network and said computer is connected to said device via a bi-directional socket connection, and wherein said computer is enabled, via a computer program installed on said computer, to detect whether said computer is utilizing said Codec monitor as a primary monitor for displaying output of said computer and to convert input device coordinates from said computer to Codec monitor resolution coordinates, to control said device through interactions, via said one or more input devices, with a graphical user interface of said device displayed by said Codec monitor.

2. The system of claim 1, wherein said device is connected to said Codec monitor.

3. The system of claim 2, wherein said Codec monitor comprises an embedded camera.

4. The system of claim 1, wherein said computer automatically connects to said device and an application running on said computer transfers actions of said one or more input devices to said device.

5. The system of claim 4, wherein said connection of said device and said computer to each other further comprises a unidirectional socket connection.

6. The system of claim 5, wherein said bidirectional socket connection comprises a TCP/IP socket connection and said unidirectional socket connection comprises a UDP socket connection.

7. The system of claim 1, wherein said device is a Codec.

8. The system of claim 1, wherein said one or more input devices comprise a keyboard and a mouse.

9. The system of claim 1, wherein said device comprises said Codec monitor for display of said digital data stream and wherein said Codec monitor operates as a display for said computer.

10. A method of integrating a computer and a Codec for video conferences, said method comprising:
    connecting said computer to said Codec, wherein said computer is separate from said Codec and said connection comprising a bi-directional socket connection, and wherein said Codec comprises an endpoint to a videoconference that displays video content for said videoconference via a Codec monitor;
    connecting said computer to a network;
    connecting said Codec to said network; and
    via an application running on said computer, transferring actions of one or more input devices connected to said computer to said Codec, wherein said application is enabled to detect whether said computer is utilizing said Codec monitor as a primary monitor for displaying output of said computer and to convert input device coordinates from said computer to Codec monitor resolution coordinates to control said Codec through interactions, via said one or more input devices, with a graphical user interface of said control device displayed by said Codec monitor.

11. The method of claim 10, wherein said one or more input devices connected to said computer comprise a keyboard.

12. The method of claim 10, wherein said one or more input devices connected to said computer comprise a mouse.

13. The method of claim 10, wherein said connection of said Codec and said computer to each other further comprises a unidirectional socket connection.

14. The method of claim 13, wherein said bidirectional socket connection comprises a TCP/IP socket connection and said unidirectional socket connection comprises a UDP socket connection.

15. The method of claim 10, wherein said Codec monitor is integrated in said Codec for display of a digital data stream and wherein said Codec monitor operates as a display for said computer after said process of transferring actions.

\* \* \* \* \*